(12) United States Patent
Chung et al.

(10) Patent No.: US 10,749,150 B2
(45) Date of Patent: Aug. 18, 2020

(54) CASE INCLUDING INSULATING LAYER FOR SECONDARY BATTERIES AND LITHIUM SECONDARY BATTERY INCLUDING THE SAME

(71) Applicant: LG Chem, Ltd., Seoul (KR)

(72) Inventors: Joo Young Chung, Daejeon (KR); Dong-Myung Kim, Daejeon (KR); Hyung Ku Yun, Daejeon (KR)

(73) Assignee: LG Chem, Ltd. (KR)

( * ) Notice: Subject to any disclaimer, the term of this patent is extended or adjusted under 35 U.S.C. 154(b) by 534 days.

(21) Appl. No.: 15/429,966

(22) Filed: Feb. 10, 2017

(65) Prior Publication Data

US 2017/0155102 A1  Jun. 1, 2017

Related U.S. Application Data

(63) Continuation of application No. PCT/KR2015/010011, filed on Sep. 23, 2015.

(30) Foreign Application Priority Data

Sep. 26, 2014  (KR) .................. 10-2014-0128971

(51) Int. Cl.
*H01M 2/02* (2006.01)

(52) U.S. Cl.
CPC ........... *H01M 2/0287* (2013.01); *H01M 2/02* (2013.01); *H01M 2/028* (2013.01); *H01M 2/0277* (2013.01)

(58) Field of Classification Search
CPC ....................................................... H01M 2/02
See application file for complete search history.

(56) References Cited

U.S. PATENT DOCUMENTS

| | | |
|---|---|---|
| 6,461,757 B1 | 10/2002 | Sasayama et al. |
| 2002/0034685 A1 | 3/2002 | Sato et al. |
| 2009/0110888 A1 | 4/2009 | Wuest et al. |
| 2010/0310911 A1 | 12/2010 | Yamamoto et al. |
| 2011/0135997 A1 | 6/2011 | Watanabe et al. |
| 2015/0017518 A1 | 1/2015 | Taniguchi |
| 2017/0155102 A1 | 6/2017 | Chung et al. |

FOREIGN PATENT DOCUMENTS

| | | |
|---|---|---|
| CN | 1252896 A | 5/2000 |
| CN | 001728437 A | 2/2006 |
| CN | 101908640 A | 12/2010 |
| CN | 102431239 A | 5/2012 |
| CN | 102627009 A | 8/2012 |
| CN | 205248318 U | 5/2016 |
| EP | 1195822 A2 | 4/2002 |

(Continued)

OTHER PUBLICATIONS

Wypych, George "Plasticizers Use and Selection for Specific Polymers." Handbook of Plasticizers, 2012, pp. 307-419., doi: 10.1016/b978-1-895198-50-8.50013-8. (Year: 2012).*

(Continued)

*Primary Examiner* — Amanda C. Walke
(74) *Attorney, Agent, or Firm* — Lerner, David, Littenberg, Krumholz & Mentlik, LLP

(57) ABSTRACT

Disclosed is a case for secondary batteries including a laminate sheet composed of multiple layers, the laminate sheet including an insulating layer having an elongation percentage of 10% or more.

17 Claims, 2 Drawing Sheets

(56) References Cited

FOREIGN PATENT DOCUMENTS

| | | | | |
|---|---|---|---|---|
| JP | 2002151159 | A | | 5/2002 |
| JP | 2005063855 | A | | 3/2005 |
| JP | 2005199481 | A | | 7/2005 |
| JP | 2008159559 | A | | 7/2008 |
| JP | 2009224218 | A | * | 10/2009 |
| JP | 2009224218 | A | | 10/2009 |
| JP | 2010282795 | A | | 12/2010 |
| JP | 2012059379 | A | * | 3/2012 |
| JP | 2012059379 | A | | 3/2012 |
| JP | 2012172091 | | | 9/2012 |
| KR | 20080037195 | A | | 4/2008 |
| KR | 20110049864 | A | | 5/2011 |
| KR | 20120040447 | A | | 4/2012 |
| KR | 20140052568 | A | | 5/2014 |
| TW | 201343383 | A | | 11/2013 |
| WO | 02058216 | A3 | | 1/2003 |

OTHER PUBLICATIONS

Koerner, George R., and Robert M. Koerner. "Puncture Resistance of Polyester (PET) and Polypropylene (PP) Needle-Punched Nonwoven Geotextiles." Geotextiles and Geomembranes, vol. 29, No. 3, 2011, pp. 360-362., doi:10.1016/j.geotexmem.2010.10.008. (Year: 2011).*

Espacenet Machine Translation of JP 2012-059379A (Year: 2019).*

Espacenet Machine Translation of JP 2009-224218A (Year: 2019).*

Hindle, Colin. "Polypropylene (PP)." British Plastics Federation, Dec. 22, 2008, https://www.bpf.co.uk/plastipedia/polymers/pp.aspx. (Year: 2008).*

Extended European Search Report for Application No. EP15843887 dated Feb. 7, 2018.

International Search Report from PCT/KR2015/010011, dated Nov. 20, 2015.

* cited by examiner

【FIG. 1】
100
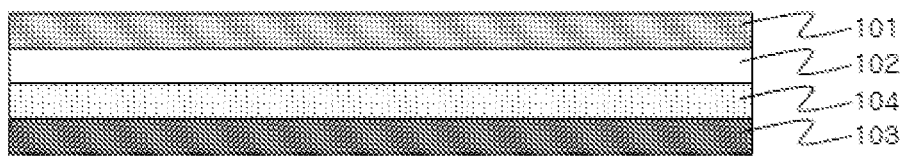
【FIG. 2】
200
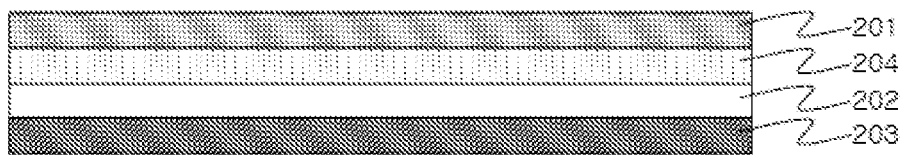
【FIG. 3】
300
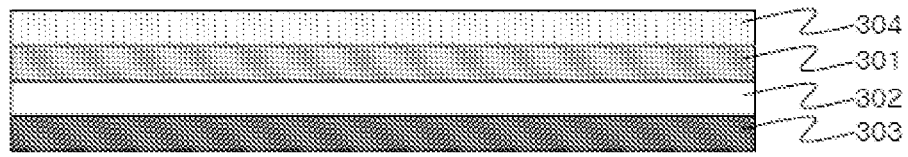

[FIG. 4]
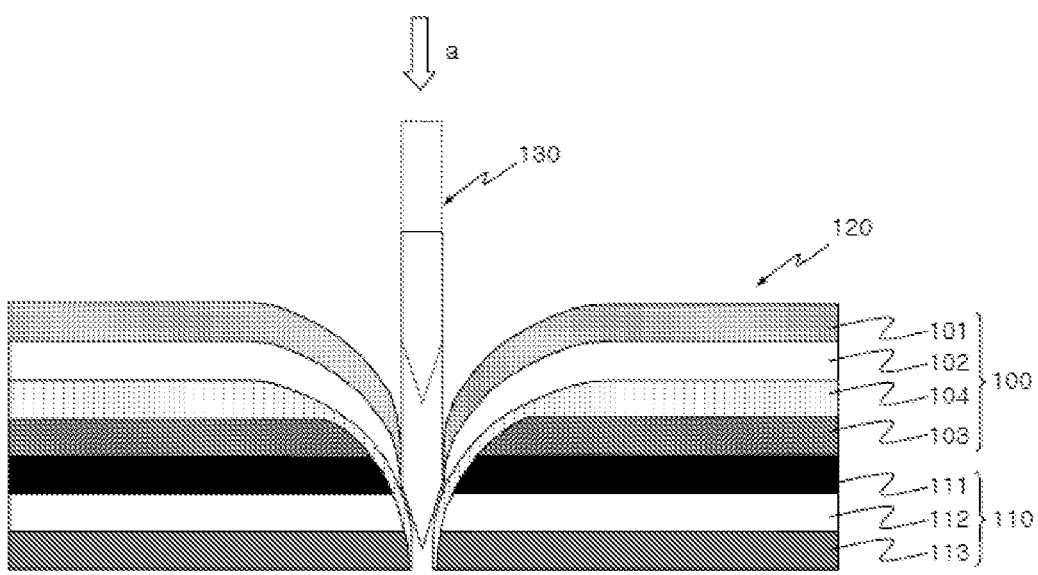

CASE INCLUDING INSULATING LAYER FOR SECONDARY BATTERIES AND LITHIUM SECONDARY BATTERY INCLUDING THE SAME

CROSS-REFERENCE TO RELATED APPLICATION

This application is a continuation of International Application No. PCT/KR2015/010011, filed Sep. 23, 2015, which claims priority to Korean Patent Application No. 10-2014-0128971, filed Sep. 26, 2014, the disclosures of which are incorporated herein by reference.

TECHNICAL FIELD

The present invention relates to a case including an insulating layer for secondary batteries and a lithium secondary battery including the same.

BACKGROUND ART

As mobile device technology continues to develop and demand therefor continues to increase, demand for secondary batteries as energy sources is rapidly increasing. Among secondary batteries, research into lithium secondary batteries, which exhibit high energy density and operation potential and have long cycle life and a low self discharge rate and discharge voltage, is underway and such lithium secondary batteries are commercially available and widely used.

However, such lithium secondary batteries have problems in regard to safety and thus attempts are being made to address such problems.

In particular, when lithium secondary batteries are overcharged, excessive lithium is released from a positive electrode and excessive lithium is inserted into a negative electrode, whereby lithium metal having very high reactivity is precipitated on a surface of the negative electrode. Accordingly, the positive electrode also becomes thermally unstable, and rapid exothermic reaction occurs due to decomposition of an inorganic solvent used as an electrolyte, whereby a battery has problems in regard to safety, such as ignition, explosion, etc.

In addition, when a battery is penetrated by an object having electric conductivity such as a nail, electrochemical energy inside the battery is changed into thermal energy and rapid heat generation occurs. Accordingly, due to subsequent heat generation, a positive electrode or a negative electrode material is subjected to chemical reaction and thus rapid exothermic reaction occurs, whereby a battery has problems in regard to safety, such as ignition, explosion, etc.

When nail penetration, compaction, impact, or the like is applied, a positive electrode and a negative electrode in a battery are subject to partial short circuit. In this case, excessive current partially flows and thus heat generation occurs. Since the size of short circuit due to the partial short circuit is inversely proportional to resistance, short circuit current mainly flows at low resistance. Here, current flows through foil mainly used as a current collector, and, when a generated heat amount is calculated, very high heat is partially generates around a portion penetrated with a nail.

When heat is generated in a battery, a separator is contracted, additional short circuit in a positive electrode and a negative electrode is induced, and short circuit ranges are enlarged due to repeated heat generation and contraction of a separator. Accordingly, thermal runaway is generated, or a positive electrode, a negative electrode and an electrolyte included in a battery react together or combust. Since such a reaction is very high exothermic reaction, a battery finally ignites or explodes. Such risk increases with increasing capacity and energy density of a lithium secondary battery.

In order to address such a problem and enhance safety upon over-charging, attempts of adding an additive to a non-aqueous electrolyte have been made. However, securement of safety under conditions such as nail penetration, compaction, impact, etc. was not accomplished by adding an additive to a non-aqueous electrolyte.

There is an urgent need for technology to develop a secondary battery which may effectively enhance safety of a battery.

DISCLOSURE

Technical Problem

Therefore, the present invention has been made to solve the above and other technical problems that have yet to be resolved.

As a result of a variety of extensive and intensive studies and experiments, the inventors of the present invention confirmed that, when a case for secondary batteries composed of a laminate sheet including an insulating layer having an elongation percentage of 10% or more is used as described below, desired effects may be accomplished, thus completing the present invention.

Technical Solution

In accordance with one aspect of the present invention, provided is a case for secondary batteries including a laminate sheet composed of multiple layers, wherein the laminate sheet includes an insulating layer having an elongation percentage of 10% or more.

In particular, an elongation percentage of the insulating layer may be 10% to 200%, more particularly 100% to 200%.

Here, the elongation percentage denotes a deformation percentage of an object fractured during testing with respect to a non-tested state.

Outside the range, when the elongation percentage of the insulating layer is less than 10%, elongation is not sufficient to prevent short circuit of a positive electrode and a negative electrode. Accordingly, as in the case in which a case that is composed of a laminate sheet composed of conventional multiple layers is used, short circuit prevention effects in a positive electrode and a negative electrode, as effects according to the present invention, might not be obtained.

In this regard, a material of each layer of a laminate sheet constituting a case according to a conventional composition has an elongation percentage of approximately less than 10%. Accordingly, when physical force such as nail penetration, compaction, impact, etc. is applied from the outside, additional elongation does not occur after being elongated to a predetermined length and thus perforation is exhibited. Accordingly, when penetration depth with a nail is deepened or external force is increased, short circuit in a positive electrode and a negative electrode easily occurs, and thus, battery stability is not secured.

However, in a case for secondary batteries further including the insulating layer according to the present invention, an insulating layer having a high elongation percentage is very deeply elongated in a shape wherein an object having conductivity as an electrode is wrapped, thus being penetrated. Accordingly, the insulating layer prevents direct contact between an object having conductivity and electrodes or direct contact between a positive electrode and a negative electrode, thereby effectively addressing the above problem.

The insulating layer according to the present invention is not limited so long as insulating properties are exhibited and an elongation percentage is within the above range, and a variety of elastic materials may be used. For example, the insulating layer may include 80% by weight or more of at least one resin selected from the group consisting of polyurethane-based resin, epoxy resin, fluorine resin, polyimide-based resin, polyester-based resin, polyolefin-based resin and phenolic resin or at least one fiber selected from the group consisting of polyurethane fiber and aramid fiber based on a total weight of the insulating layer.

That is, the insulating layer may be composed of only the above materials or may include other resin types or a predetermined additive, etc. for enhancing an elongation percentage, etc.

In particular, when the insulating layer according to the present invention is composed of only the above materials, the insulating layer is preferably composed of polyurethane fiber and/or aramid fiber having a high elongation percentage.

Meanwhile, when a predetermined additive for enhancing an elongation percentage, other than the above materials, is further included, the additive may be a plasticizer. In particular, the insulating layer may be composed of a blending composition of at least one resin selected from the group consisting of polyurethane-based resin, epoxy resin, fluorine resin, polyimide-based resin, polyester-based resin, polyolefin-based resin and phenolic resin or at least one fiber selected from the group consisting of polyurethane fiber and aramid fiber and a plasticizer. Here, a plasticizer is not specifically limited and, as the plasticizer, a material publicly known in the art, for example, a phthalate-based material, an adipate-based material, an epoxy-based material, an ester-based material, or the like may be used.

In a specific embodiment, the melting point of the insulating layer according to the present invention having the composition may be 100° C. or more, particularly 100° C. to 130° C.

Outside the range, when the melting point is less than 100° C., the insulating layer is damaged before preventing direct contact between an object having conductivity and electrodes or between a positive electrode and a negative electrode by heat generation due to nail penetration, compaction, impact, etc.

In addition, a puncture strength of the insulating layer may be 200 gf or more, particularly 200 gf to 500 gf, more particularly 220 gf to 450 gf.

Outside the puncture strength range, when the puncture strength is less than 200 gf, short circuit prevention effects in a positive electrode and a negative electrode through elongation of the insulating layer according to the present invention might not be exhibited.

The thickness of such an insulating layer may be 1 to 150 micrometers, particularly 5 to 30 micrometers.

Outside the range, when the thickness of the insulating layer is less than 1 micrometer, puncture strength is decreased due to too thin insulating layer and thus it is difficult to exhibit effects according to the present invention. When the thickness is greater than 150 micrometers, the thickness of a case for secondary batteries is increased due to excess insulating layer thickness and thus an overall volume is increased, whereby capacity per unit volume is decreased.

Hereinafter, a structure of a laminate sheet including the insulating layer, as the case for secondary batteries according to the present invention, is described in detail.

In particular, the laminate sheet may have a three-layer or more structure including the insulating layer.

In particular, the laminate sheet may be composed of an insulating layer, a first layer, and a second layer, and the insulating layer may be disposed between the first layer and the second layer or the insulating layer and the second layer may be respectively formed on one side and another side of the first layer.

A case for secondary batteries according to the present invention is manufactured through a process of forming a receiving part of an electrode assembly using a laminate sheet having the above laminated structure. Here, when a part in which an electrode assembly is embedded is defined as an inner side and, in a case equipped with the electrode assembly, a part contacting the exterior is defined as an outer side, the first layer is present outside the second layer. Accordingly, the laminate sheet may have a structure of the first layer-the insulating layer-the second layer, or the insulating layer-the first layer-the second layer from the outer side to the inner side.

Here, the first layer and the second layer are respectively a polymer layer or a metal layer. However, the second layer located in a part in which the electrode assembly is embedded is preferably a polymer layer that does not react with an electrolyte.

Meanwhile, the first layer or the second layer may be composed of more particularly two layers. Accordingly, the laminate sheet may have a four-layer structure.

In particular, when the first layer is composed of two layers, the first layer may have a two-layer structure including an outer layer composed of a polymer and an intermediate layer composed of metal. When the second layer is composed of two layers, the second layer may have a two-layer structure including an inner layer composed of a polymer and an intermediate layer composed of metal. Here, the intermediate layer is present between an outer layer and an inner side.

That is, when the laminate sheet according to the present invention has a four-layer structure, the laminate sheet may have a structure such as an outer layer-an intermediate layer-an insulating layer-an inner layer, an outer layer-an insulating layer-an intermediate layer-an inner layer, or an insulating layer-an outer layer-an intermediate layer-an inner layer from an outer side to an inner side.

Of course, the first layer and the second layer may respectively have two layers and thus the laminate sheet may have a five layer structure composed of an outer layer-an intermediate layer-an insulating layer-an intermediate layer-an inner layer.

In order to effectively prevent short circuit while considering elongation, the insulating layer is preferably disposed between the first layer and the second layer. In particular, a four-layer structure of an outer layer-an intermediate layer-an insulating layer-an inner layer, or an outer layer-an insulating layer-an intermediate layer-an inner layer is preferable.

Here, the outer layer preferably has superior resistance against an exterior environment and may be composed of a weather-resistant polymer having predetermined tensile strength and weather resistance. For example, the outer layer may be composed of polyethylene terephthalate (PET), polyethylene naphthalate (PEN) or nylon. When the laminate sheet has a three-layer structure and the first layer is a polymer layer, the first layer also may be composed of the above material.

The intermediate layer may be a metal layer to prevent a material such as gas, moisture, or the like from being introduced or leaked, and to enhance strength of a case. For example, the intermediate layer may be composed of a metal selected from the group consisting of aluminum (Al), iron (Fe), copper (Cu), tin (Sn), nickel (Ni), cobalt (Co), silver (Ag), stainless steel, carbon (C), chromium (Cr), manganese (Mn) and titanium (Ti), or an alloy thereof, but the present invention is not limited thereto. When the laminate sheet has a three-layer structure, a metal layer may be composed of the materials described above.

The inner layer is preferably composed of a thermosetting polymer that has thermosetting properties (thermal bondability) and low hygroscopicity to inhibit introduction of an electrolyte, and is not swelled or corroded. For example, the thermosetting polymer may be a polyolefin-based resin, more particularly a cast polypropylene (CPP) resin. When the laminate sheet has a three-layer structure and the second layer is a polymer layer, the second layer may be composed of the above material.

In addition, the present invention provides a secondary battery including a case for secondary batteries composed of a laminate sheet including the insulating layer, an electrode assembly, and an electrolyte. The secondary battery is not specifically limited and may be particularly a lithium secondary battery wherein an electrode assembly is impregnated with an electrolyte including a lithium salt.

The electrode assembly includes a positive electrode and a negative electrode such that charge/discharge is possible. For example, the electrode assembly may have a folding-type (jelly-roll), stack-type or stack/folding-type structure wherein a positive electrode, a negative electrode and a separator between the positive electrode and the negative electrode are laminated. A positive electrode tab and a negative electrode tab of the electrode assembly may be protruded to the outside of a battery directly or through a separate lead to which the electrode tabs are connected.

The positive electrode is fabricated by coating a mixture of a positive electrode active material, a conductive material, and a binder on a positive electrode current collector and drying and pressing the coated positive electrode current collector. As desired, the mixture may further include a filler.

The positive electrode current collector is generally fabricated to a thickness of 3 to 500 µm. The positive electrode current collector is not particularly limited so long as it does not cause chemical changes in the fabricated secondary battery and has high conductivity. For example, the positive electrode current collector may be made of stainless steel, aluminum, nickel, titanium, sintered carbon, or aluminum or stainless steel surface-treated with carbon, nickel, titanium, silver, or the like. The positive electrode current collector may have fine irregularities at a surface thereof to increase adhesion between a positive electrode active material and the positive electrode current collector. In addition, the positive electrode current collector may be used in any of various forms including films, sheets, foils, nets, porous structures, foams, and non-woven fabrics.

Examples of the positive electrode active material include layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ where $0 \leq x \leq 0.33$, $LiMnO_3$, $LiMn_2O_3$, $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having Formula $LiNi_{1-x}M_xO_2$ where M=Co, Mn, Al, Cu, Fe, Mg, B, or Ga, and $0.01 \leq x \leq 0.3$; lithium manganese composite oxides having Formula $LiMn_{2-x}M_xO_2$ where M=Co, Ni, Fe, Cr, Zn, or Ta, and $0.01 \leq x \leq 0.1$ or Formula $Li_2Mn_3MO_8$ where M=Fe, Co, Ni, Cu, or Zn; spinel-structure lithium manganese composite oxides represented by $LiNi_xMn_{2-x}O_4$; $LiMn_2O_4$ where some Li atoms are substituted with alkaline earth metal ions; disulfide compounds; and $Fe_2(MoO_4)_3$, but the present invention is not limited thereto.

The conductive material is typically added in an amount of 1 to 30 wt % with respect to the total weight of the mixture including the positive electrode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between the active material and the conductive material and in binding of the electrode active material to the current collector. The binder is typically added in an amount of 1 to 30 wt % with respect to the total weight of the mixture including the positive electrode active material. Examples of the binder include polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The filler is optionally used as a component to inhibit positive electrode expansion. The filler is not particularly limited so long as it is a fibrous material that does not cause chemical changes in the fabricated battery. Examples of the filler include olefin based polymers such as polyethylene and polypropylene; and fibrous materials such as glass fiber and carbon fiber.

The negative electrode is manufactured by coating, drying and pressing a negative electrode active material on the negative electrode current collector, and, as needed, the conductive material, the binder, the filler, etc. may be selectively further included.

The negative electrode current collector is typically fabricated to a thickness of 3 to 500 µm. The negative electrode current collector is not particularly limited so long as it does not cause chemical changes in the fabricated secondary battery and has conductivity. For example, the negative electrode current collector may be made of copper, stainless steel, aluminum, nickel, titanium, sintered carbon, copper or stainless steel surface-treated with carbon, nickel, titanium, or silver, and aluminum-cadmium alloys. Similar to the positive electrode current collector, the negative electrode current collector may also have fine irregularities at a surface thereof to enhance adhesion between the negative electrode current collector and an negative electrode active material. In addition, the negative electrode current collector may be used in various forms including films, sheets, foils, nets, porous structures, foams, and non-woven fabrics.

As the negative electrode active material, for example, carbon such as hard carbon, graphite based carbon; metal composite oxides such as $Li_xFe_2O_3$ ($0 \leq x \leq 1$, $Li_xWO_2$ where $0 \leq x \leq 1$, $Sn_xMe_{1-x}Me'_yO_z$ where Me: Mn, Fe, Pb or Ge; Me': Al, B, P, Si, Group I, Group II and Group III elements, or halogens; $0 \leq x \leq 1$; $1 \leq y \leq 3$; and $1 \leq z \leq 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials; and the like may be used.

The separator is disposed between the positive electrode and the negative electrode. As the separator, an insulating thin film having high ion permeability and mechanical strength is used. A pore diameter of the separator is typically 0.01 to 10 μm and a thickness thereof is typically 5 to 300 μm. Examples of such a separator include sheets or nonwoven fabrics made of an olefin polymer such as polypropylene, glass fibers, or polyethylene, which have chemical resistance and hydrophobicity, Kraft paper, etc. When, as an electrolyte, a solid electrolyte is used, the solid electrolyte also functions as a separator.

The electrolyte may be a lithium salt-containing non-aqueous electrolyte, the lithium salt-containing non-aqueous electrolyte is composed of a non-aqueous electrolyte and a lithium salt, and examples of the non-aqueous electrolyte include non-aqueous organic solvents, organic solid electrolytes, inorganic solid electrolytes, etc., but the present invention is not limited thereto.

Examples of the non-aqueous organic solvent include aprotic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

Examples of the organic solid electrolyte include, but are not limited to, polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymerization agents containing ionic dissociation groups.

Examples of the inorganic solid electrolyte include, but are not limited to, nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

A lithium salt is a material that is readily soluble in the non-aqueous electrolyte and examples thereof include, but are not limited to, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, and aluminum trichloride may be added to the electrolyte. If necessary, in order to impart incombustibility, the electrolyte may further include halogen-containing solvents such as carbon tetrachloride and ethylene trifluoride. Further, in order to enhance high-temperature storage characteristics, the electrolyte may further include carbon dioxide gas, fluoro-ethylene carbonate (FEC), propene sultone (PRS), etc.

In a specific embodiment, a lithium salt-containing non-aqueous electrolyte may be prepared by adding a lithium salt such as $LiPF_6$, $LiClO_4$, $LiBF_4$, or $LiN(SO_2CF_3)_2$ to a mixed solvent including EC or PC, which is a high dielectric solvent and a cyclic carbonate, and DEC, DMC, or EMC, which is a low viscosity solvent and a linear carbonate.

The present invention provides a battery pack including the secondary battery and a device including the battery pack.

Here, specific examples of the device includes, but are not limited to, mobile phones, portable computers, smart phones, tablet PCs, smart pads, net books, light electric vehicles (LEVs), electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

A structure of such a device and a method of manufacturing the same are publicly known in the art and, thus, detailed description thereof is omitted in the present specification.

BRIEF DESCRIPTION OF THE DRAWINGS

The above and other objects, features and other advantages of the present invention will be more clearly understood from the following detailed description taken in conjunction with the accompanying drawings, in which:

FIG. 1 illustrates a partial cross-sectional view of a case for secondary batteries according to an embodiment of the present invention;

FIG. 2 illustrates a partial cross-sectional view of a case for secondary batteries according to another embodiment of the present invention;

FIG. 3 illustrates a partial cross-sectional view of a case for secondary batteries according to another embodiment of the present invention; and FIG. 4 illustrates a partial cross-sectional view of an outermost portion when a secondary battery in which the case of FIG. 1 is used is penetrated with a needle-shaped conductor.

MODE FOR INVENTION

Now, the present invention will be described in more detail with reference to the accompanying drawings. These examples are provided for illustrative purposes only and should not be construed as limiting the scope and spirit of the present invention.

FIGS. 1 to 3 schematically illustrate partial cross-sectional views of cases 100, 200 and 300 for secondary batteries according to an embodiment of the present invention.

First, referring to FIG. 1, a case 100 includes an outer layer 101, an inner layer 103, and an intermediate layer 102, and is composed of a four-layer laminate sheet that further includes an insulating layer 104 having an elongation percentage of 10% or more to secure safety against external force between the inner layer 103 and the intermediate layer 102.

In particular, the outer layer 101 is composed of polyethylene terephthalate (PET), polyethylene naphthalate (PEN) or nylon, the inner layer 103 is composed of a polyolefin-based resin, and the intermediate layer 102 is composed of a metal selected from the group consisting of aluminum (Al), iron (Fe), copper (Cu), tin (Sn), nickel (Ni), cobalt (Co), silver (Ag), stainless steel, carbon (C), chromium (Cr), manganese (Mn) and titanium (Ti), or an alloy thereof.

Meanwhile, the insulating layer 104 as an insulative material a having a high elongation percentage and guaranteeing battery safety is not specifically limited so long as a high elongation percentage is secured, and is composed of at least one resin selected from the group consisting of a polyurethane-based resin, an epoxy resin, a fluorine resin, a polyimide-based resin, a polyester-based resin, a polyolefin-based resin and a phenolic resin or at least one fiber selected from the group consisting of polyurethane fiber and aramid fiber, as a main ingredient. The insulating layer 104 has a puncture strength of 200 gf or more.

Referring to FIGS. 1, 2 and 3, partial cross-sectional views of cases 200 and 300 composed of a laminate sheet, wherein locations of insulating layers 204 and 304 are different are illustrated.

In particular, in FIG. 2, a case 200 includes an outer layer 201, an inner layer 203, and an intermediate layer 202, and is composed of a four-layer laminate sheet that further includes an insulating layer 204 having an elongation percentage of 10% or more to secure safety against external force between the outer layer 201 and the intermediate layer 202. In FIG. 3, a case 300 includes an outer layer 301, an inner layer 303 and an intermediate layer 302, and is composed of a four-layer laminate sheet that further includes an insulating layer 304 having an elongation percentage of 10% or more to secure safety against force outside the outer layer 301 as an outermost layer.

As illustrated in FIGS. 1 to 3, when the cases including the insulating layer are used, an insulating layer is elongated even upon application of physical force such as nail penetration, compaction, impact, etc. from the outside and thus short circuit of a positive electrode and a negative electrode is prevented, thereby inhibiting ignition and enhancing battery safety.

In order to particularly describe such a function, it is illustrated in FIG. 4 that a secondary battery 120 including the case 100 illustrated in FIG. 1 as an exemplary embodiment is vertically penetrated with a needle-shaped conductor 130.

Referring to FIG. 4, a secondary battery 200 includes the electrode assembly 110 that partially includes a laminated positive electrode 113/separator 112/negative electrode 111 structure and the case 100 that is located in an outer side of the electrode assembly 110. However, FIG. 4 is a view of partially illustrating the secondary battery, and an overall structure of the secondary battery is not separately illustrated since it is the same as that known in the art.

When the secondary battery 200 including the electrode assembly 110 and the case 100 is vertically (a) penetrated with the needle-shaped conductor 130, the needle-shaped conductor 130 sequentially penetrates the secondary battery 200 in the order of the outer layer 101 of the case 100 as an outermost layer, the intermediate layer 102, the insulating layer 104 and the inner layer 103, and the negative electrode 111, the separator 112 and the positive electrode 113 constituting the electrode assembly. Here, the needle-shaped conductor 130 penetrates the secondary battery 200 while causing elongation in a movement direction of the needle-shaped conductor 130 due to penetration force and frictional force to each of layers 101, 102, 104 and 103 of the case 100. Here, the outer layer 101 and the intermediate layer 102 do not have a high elongation percentage, thus not being elongated to a predetermined depth or more. On the other hand, the insulating layer 104 according to the present invention having a very high elongation percentage is very deeply elongated in a shape of wrapping the needle-shaped conductor 130 and then penetrated. Accordingly, the insulating layer 104 prevents direct contact between the needle-shaped conductor 130 and electrodes 111 and 113, or direct contact between the positive electrode 113 and the negative electrode 111.

Accordingly, safety may be considerably enhanced by preventing ignition according to thermal runaway of the secondary battery 200 due to outer force such as penetration with the needle-shaped conductor 130.

Now, the present invention will be described in more detail with reference to the following Examples. These examples are provided for illustrative purposes only and should not be construed as limiting the scope and spirit of the present invention.

Example 1

$LiCoO_2$ was used as positive electrode active material, and 96% by weight of $LiCoO_2$, 2.0% by weight of Denka Black as a conductive material and 2.0% by weight of PVdF as a binder were added to N-methyl-2-pyrrolidone (NMP) as a solvent, thereby preparing a positive electrode mixture slurry. Subsequently, the slurry was coated, dried and pressed on aluminum foil, thereby manufacturing a positive electrode.

Artificial graphite was used as a negative electrode active material, and 96% by weight of artificial graphite, 1% by weight of Denka Black as a conductive material and 3% by weight of PVdF as a binder were added to NMP as a solvent, thereby preparing a negative electrode mixture slurry. Subsequently, the slurry was coated, dried and pressed on copper foil, thereby manufacturing a negative electrode.

A porous polyethylene film having a thickness of 16 μm was disposed between the positive electrode and the negative electrode, thereby manufacturing an electrode assembly. As illustrated in FIG. 1, the electrode assembly was embedded in the case according to the present invention composed of a laminate sheet having a structure of an outer layer/an intermediate layer/an insulating layer/an inner layer. Subsequently, a 1 M $LiPF_6$ carbonate-based solution was injected into an electrolyte, thereby completing a secondary battery. Here, as an insulating layer, a polyurethane resin having an elongation percentage of 100% and a puncture strength of 400 gf was used.

Comparative Example 1

A secondary battery was manufactured in the same manner as in Example 1, except that, as a battery case, a conventional case composed of a laminate sheet having a structure of an outer layer/an intermediate layer/an inner layer was used.

Comparative Example 2

A secondary battery was manufactured in the same manner as in Example 1, except that, as an insulating layer, a polyurethane resin having an elongation percentage of 5% and a puncture strength of 150 gf was used.

Experimental Example 1

20 secondary batteries manufactured according to each of Example 1 and Comparative Examples 1 to 2 were completely charged to 4.35 V. As illustrated in FIG. 4, a middle portion of each of the batteries was penetrated with a nail having a diameter of 2.5 mm composed of iron using a nail penetration tester, and ignition thereof was observed.

Here, a penetration speed of the nail was constantly set to 12 m/min. Results are summarized in Table 1 below.

TABLE 1

|  | Ignition |
|---|---|
| Example 1 | No ignition |
| Comparative Example 1 | Ignited |
| Comparative Example 2 | Ignited |

As shown in Table 1, it can be confirmed that short circuit is not induced and thus ignition does not occur in all of the 20 secondary batteries according to the present invention, but short circuit and ignition are observed in a majority of the secondary batteries according to Comparative Examples 1 and 2.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, a case for secondary batteries according to the present invention includes an insulating layer having an elongation percentage of 10% or more, and thus, the insulating layer is elongated even when physical force such as nail penetration, compaction, impact, etc. from the outside is applied to the case. Accordingly, short circuit of a positive electrode and a negative electrode may be prevented and thus ignition may be inhibited, thereby enhancing battery safety.

The invention claimed is:

1. A case for secondary batteries comprising:
a laminate sheet composed of multiple layers,
wherein the laminate sheet comprises
an insulating layer, a first layer, and a second layer, and the insulating layer is disposed between the first layer and the second layer,
wherein the insulating layer having an elongation percentage of 10% or more,
wherein the insulating layer comprises 80% by weight or more of at least one resin selected from the group consisting of polyurethane-based resin, epoxy resin, fluorine resin, polyimide-based resin, polyester-based resin, polyolefin-based resin and phenolic resin or at least one fiber selected from the group consisting of polyurethane fiber and aramid fiber based on a total weight of the insulating layer, and
wherein the insulating layer has a melting point of 100° C. or more.

2. The case according to claim 1, wherein the insulating layer has an elongation percentage of 100% to 200%.

3. The case according to claim 1, wherein the insulating layer is composed of the polyurethane fiber, or the aramid fiber, or the polyurethane fiber and the aramid fiber.

4. The case according to claim 1, wherein the insulating layer is composed of a blended composition of the at least one resin selected from the group consisting of polyurethane-based resin, epoxy resin, fluorine resin, polyimide-based resin, polyester-based resin, polyolefin-based resin and phenolic resin or the at least one fiber selected from the group consisting of polyurethane fiber and aramid fiber, and a plasticizer.

5. The case according to claim 1, wherein the insulating layer has a puncture strength of 200 gf or more.

6. The case according to claim 1, wherein a thickness of the insulating layer is 1 to 150 micrometers.

7. The case according to claim 1, wherein the first layer has a two-layer structure comprising an outer layer composed of a polymer and an intermediate layer composed of metal.

8. The case according to claim 7, wherein the outer layer is composed of polyethylene terephthalate (PET), polyethylene naphthalate (PEN) or nylon.

9. The case according to claim 7, wherein the intermediate layer is composed of a metal selected from the group consisting of aluminum (Al), iron (Fe), copper (Cu), tin (Sn), nickel (Ni), cobalt (Co), silver (Ag), stainless steel, carbon (C), chromium (Cr), manganese (Mn) and titanium (Ti) or an alloy thereof.

10. The case according to claim 1, wherein the second layer has a two-layer structure comprising an inner layer composed of a polymer and an intermediate layer composed of metal.

11. The case according to claim 10, wherein the inner layer is composed of a polyolefin-based resin.

12. The case according to claim 10, wherein the intermediate layer is composed of a metal selected from the group consisting of aluminum (Al), iron (Fe), copper (Cu), tin (Sn), nickel (Ni), cobalt (Co), silver (Ag), stainless steel, carbon (C), chromium (Cr), manganese (Mn) and titanium (Ti), or an alloy thereof.

13. A secondary battery comprising the case according to claim 1, an electrode assembly and an electrolyte.

14. A battery pack comprising the secondary battery according to claim 13.

15. A device comprising the battery pack according to claim 14.

16. The device according to claim 15, wherein the device is selected from the group consisting of mobile phones, portable computers, smart phones, tablet PCs, smart pads, netbooks, light electric vehicles (LEVs), electric vehicles, hybrid electric vehicles, plug-in hybrid electric vehicles, and systems for storing power.

17. A case for secondary batteries comprising:
a laminate sheet composed of multiple layers,
wherein the laminate sheet comprises
an insulating layer, a first layer, and a second layer, and the insulating layer and the second layer are respectively formed on one side and another side of the first layer,
wherein the insulating layer having an elongation percentage of 10% or more,
wherein the insulating layer comprises 80% by weight or more of
at least one resin selected from the group consisting of polyurethane-based resin, epoxy resin, fluorine resin, polyimide-based resin, polyester-based resin, polyolefin-based resin and phenolic resin or at least one fiber selected from the group consisting of polyurethane fiber and aramid fiber based on a total weight of the insulating layer, and wherein the insulating layer has a melting point of 100° C. or more.

\* \* \* \* \*